(12) United States Patent
Kadoya

(10) Patent No.: US 10,996,342 B2
(45) Date of Patent: May 4, 2021

(54) POSITIONING APPARATUS AND POSITIONING METHOD

(71) Applicant: MITSUBISHI ELECTRIC CORPORATION, Chiyoda-ku (JP)

(72) Inventor: Takuma Kadoya, Chiyoda-ku (JP)

(73) Assignee: MITSUBISHI ELECTRIC CORPORATION, Chiyoda-ku (JP)

( * ) Notice: Subject to any disclaimer, the term of this patent is extended or adjusted under 35 U.S.C. 154(b) by 441 days.

(21) Appl. No.: 15/546,081

(22) PCT Filed: Jan. 29, 2015

(86) PCT No.: PCT/JP2015/052548
§ 371 (c)(1),
(2) Date: Jul. 25, 2017

(87) PCT Pub. No.: WO2016/121058
PCT Pub. Date: Aug. 4, 2016

(65) Prior Publication Data
US 2017/0363746 A1 Dec. 21, 2017

(51) Int. Cl.
*G01S 19/42* (2010.01)
*G01S 19/36* (2010.01)
(Continued)

(52) U.S. Cl.
CPC .............. *G01S 19/42* (2013.01); *G01S 19/36* (2013.01); *G01S 19/396* (2019.08); *G01S 19/426* (2013.01); *G01S 19/48* (2013.01)

(58) Field of Classification Search
CPC ........ G01S 19/21; G01S 19/215; G01S 19/22; G01S 19/36; G01S 19/42; G01S 19/426; G01S 19/48
See application file for complete search history.

(56) References Cited

U.S. PATENT DOCUMENTS

| 2005/0107052 A1* | 5/2005 | Zangerl | G01S 19/36 |
| | | | 455/129 |
| 2010/0138147 A1* | 6/2010 | T'Siobbel | G01S 19/22 |
| | | | 701/533 |

(Continued)

FOREIGN PATENT DOCUMENTS

| JP | 2000-329839 A | 11/2000 |
| JP | 2003-114272 A | 4/2003 |

(Continued)

OTHER PUBLICATIONS

P. Axelrad, GPS Navigation Algorithms, in B.W. Parkinson et al. (Ed.), Global Positioning System: Theory and Applications, vol. 1; Progress in Astronautics and Aeronautics, vol. 163, American Institute of Aeronautics and Astronautics, Inc., p. 409-433, 1996 (Year: 1996).*

(Continued)

*Primary Examiner* — Bernarr E Gregory
*Assistant Examiner* — Fred H Mull
(74) *Attorney, Agent, or Firm* — Oblon, McClelland, Maier & Neustadt, L.L.P.

(57) ABSTRACT

A positioning apparatus, including: positioning calculation devices for positioning for a plural antenna, to acquire positioning results indicating the antennas positions and accuracy indices indicating accuracies of the positions, the antennas receiving GPS satellites signals and having a known distance between each antennas; and a determination device including: a determination unit performing first determination whether accuracies indicated by the accuracy indices of two antennas out of the plural antenna is higher than a first threshold and second determination whether a difference between a measured distance between the two antennas based on a difference between positioning results of the antennas and an actual distance therebetween is smaller than a second threshold, to thereby acquire a reliability index (RI)

(Continued)

and a final positioning result (FPR) based on the two determinations; and an output signal generation unit for generating positioning information for controlling a human interface (HI) to notify a result based on the (FPR) and (RI).

5 Claims, 6 Drawing Sheets

(51) Int. Cl.
  *G01S 19/39* (2010.01)
  *G01S 19/48* (2010.01)

(56) References Cited

U.S. PATENT DOCUMENTS

2010/0159885 A1* 6/2010 Selgert ............... G01S 5/0072
  455/412.1
2011/0043373 A1* 2/2011 Best ...................... G01S 5/02
  340/8.1
2011/0111772 A1* 5/2011 Tysowski .............. G01S 19/48
  455/456.3
2013/0150085 A1* 6/2013 Jin ........................ G01S 19/48
  455/456.2

FOREIGN PATENT DOCUMENTS

| | | |
|---|---|---|
| JP | 2008-076123 A | 4/2008 |
| JP | 2012-225769 A | 11/2012 |
| JP | 2013-130480 A | 7/2013 |

OTHER PUBLICATIONS

International Search Report dated Mar. 17, 2015 in PCT/JP2015/052548 filed Jan. 29, 2015.

* cited by examiner

POSITIONING APPARATUS AND POSITIONING METHOD

TECHNICAL FIELD

The present invention relates to a positioning apparatus mounted in a mobile body, such as a train or an automobile, to perform positioning through use of signals from GPS satellites, and to a positioning method for performing positioning through use of signals from GPS satellites.

BACKGROUND ART

In positioning that uses signals from Global Positioning System (GPS) satellites, distances between a positioning apparatus and a plurality of GPS satellites are acquired based on signals from the plurality of GPS satellites, and a position of the positioning apparatus is acquired based on the acquired distances. Further, in this positioning, an accuracy index indicating an accuracy of the acquired positioning result is also acquired. It is then determined based on the accuracy index whether or not the positioning result can be used.

For example, in RTK positioning, in positioning calculation, determination as to whether the positioning result is "FIX state" or "FLOAT state" is used as the accuracy index, and only the FIX solution is used.

CITATION LIST

Patent Literature

[PTL 1] JP 2008-076123 A

SUMMARY OF INVENTION

Technical Problem

However, the following problems exist in such a method.
(1) A utilization rate of the positioning result decreases due to use of only a highly-accurate positioning result.
(2) When an erroneous highly-accurate positioning result (e.g., an erroneous FIX solution in RTK positioning) is generated, an erroneous position is used as a result.

As a related-art positioning apparatus configured to use signals from GPS satellites and to enhance an accuracy of determination of an own-vehicle position, the following positioning apparatus is known.

In this positioning apparatus, two GPS receivers are used. When positioning accuracies of the two GPS receivers are higher than a predetermined criterion, positions indicated by first own-vehicle position information and second own-vehicle position information are close to each other within a predetermined range, and road information (e.g., a road link) does not exist within the predetermined range, switching means calculates an average value (position and direction) of the first own-vehicle position information and the second own-vehicle position information and adopts the average value as an own-vehicle position in place of a result of map matching (see Patent Literature 1).

The present invention has been made in order to solve the above-mentioned problems, and it is an object of the present invention to provide a positioning apparatus and a positioning method for increasing a utilization rate of a positioning result and decreasing erroneous positioning.

Solution to Problem

According to one embodiment of the present invention, there are provided a positioning apparatus and the like, including: a plurality of antennas configured to receive signals from GPS satellites and having a known distance between each pair of antennas among the plurality of antennas; positioning calculation devices configured to perform positioning for respective antennas, respectively, to obtain positioning results indicating positions of the plurality of antennas and accuracy indices indicating accuracies of the positioning results; and a determination device including: a determination unit configured to perform first determination of determining whether or not accuracies indicated by the accuracy indices of two antennas out of the plurality of antennas are each higher than an accuracy indicated by a threshold and second determination of determining whether or not a difference between a measured distance between the two antennas based on a difference between positioning results of the two antennas and an actual distance between the two antennas is smaller than a threshold, to thereby acquire a reliability index and a final positioning result in accordance with results of the first determination and the second determination; and an output signal generation unit configured to generate positioning information for controlling a human interface configured to notify a result in accordance with the final positioning result and the reliability index.

Advantageous Effects of Invention

According to the present invention, the positioning apparatus and the positioning method for increasing the utilization rate of the positioning result and decreasing erroneous positioning can be provided.

DESCRIPTION OF EMBODIMENTS

Now, a positioning apparatus and a positioning method according to each of embodiments of the present invention are described with reference to the drawings. Note that, in each of the embodiments, the same or corresponding por-

First Embodiment

Figure 1:
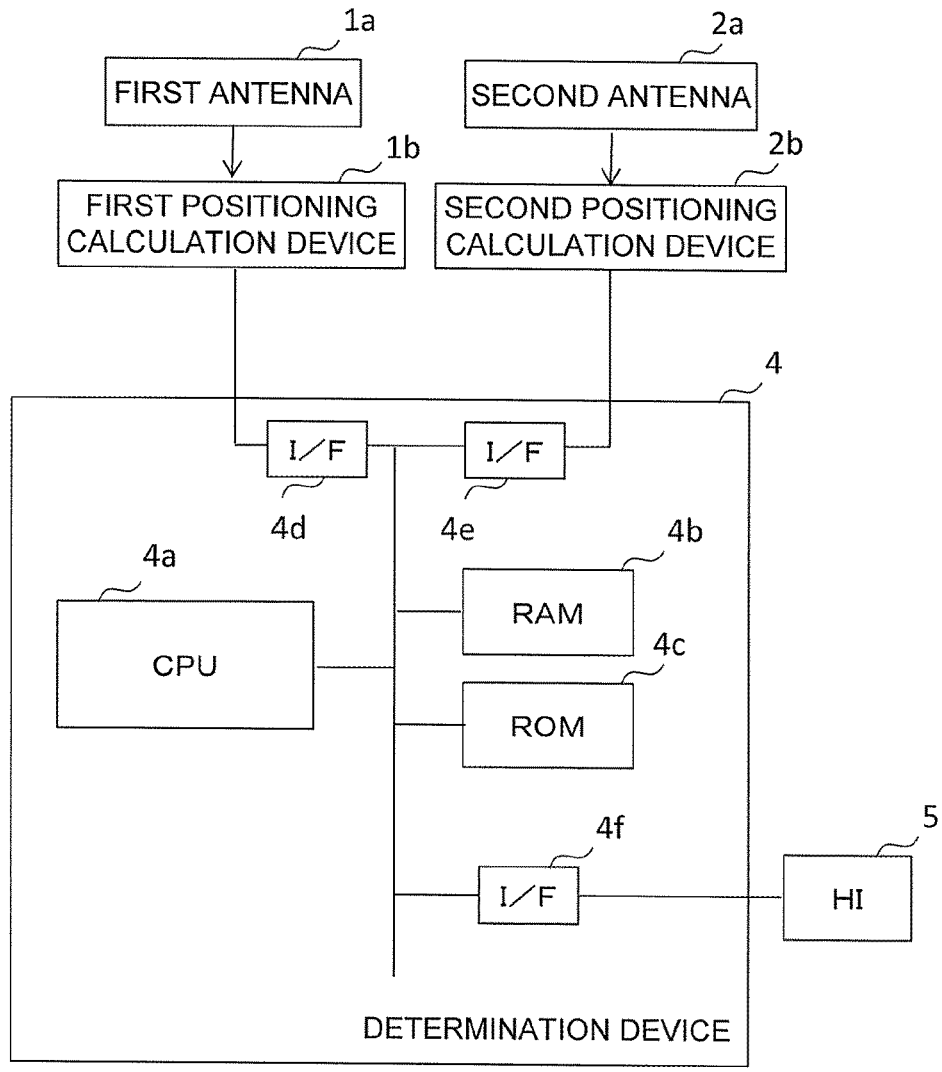
FIG. 1 is a diagram for illustrating a configuration of a positioning apparatus according to a first embodiment of the present invention.
Figure 2:
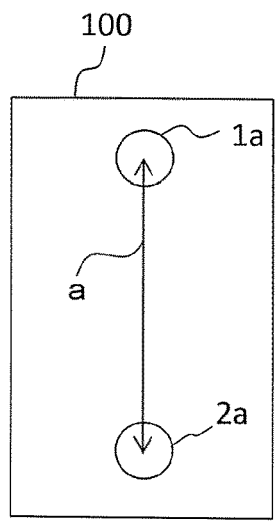
FIG. 2 is a diagram for illustrating an example of how antennas of FIG. 1 are arranged.

FIG. 1 is a diagram for illustrating a configuration of a positioning apparatus according to a first embodiment of the present invention. FIG. 2 is a diagram for illustrating an example of how antennas of FIG. 1 are arranged. FIG. 1 is an illustration of a configuration in a case where two antennas configured to receive signals from GPS satellites are arranged. A first antenna 1a and a second antenna 2a are configured to receive signals from the GPS satellites. As illustrated in FIG. 2, for example, those antennas are fixed onto a rigid body 100 while being separated from each other by a distance a set in advance. The rigid body 100 is, for example, a vehicle body of a mobile body, such as a train or an automobile. Radio Frequency (RF) signals from the first antenna 1a and the second antenna 2a are used by a first positioning calculation device 1b and a second positioning calculation device 2b for positioning calculation, respectively, and further, positioning results obtained by the respective positioning calculation devices are input to a determination device 4. An antenna and a positioning calculation device form one GPS receiver.

The determination device 4 includes a processor. The determination device 4 includes, as its basic components, for example, a CPU 4a being an arithmetic processing unit, a ROM 4c being a non-volatile memory configured to store programs to be executed by the CPU 4a, data, and others, and a RAM 4b being a volatile memory configured to temporarily store data and others. The positioning results and accuracy indices from the first and second positioning calculation devices 1b and 2b are input to the determination device 4 via interfaces (I/Fs) 4d and 4e, respectively. Positioning information containing a final positioning result etc. obtained by the determination device 4 is output via an I/F 4f to a human interface (HI) 5 including a display device, for example. The HI 5 is configured to make an announcement through display or sound in a manner set in advance in accordance with the positioning information.

Figure 3:
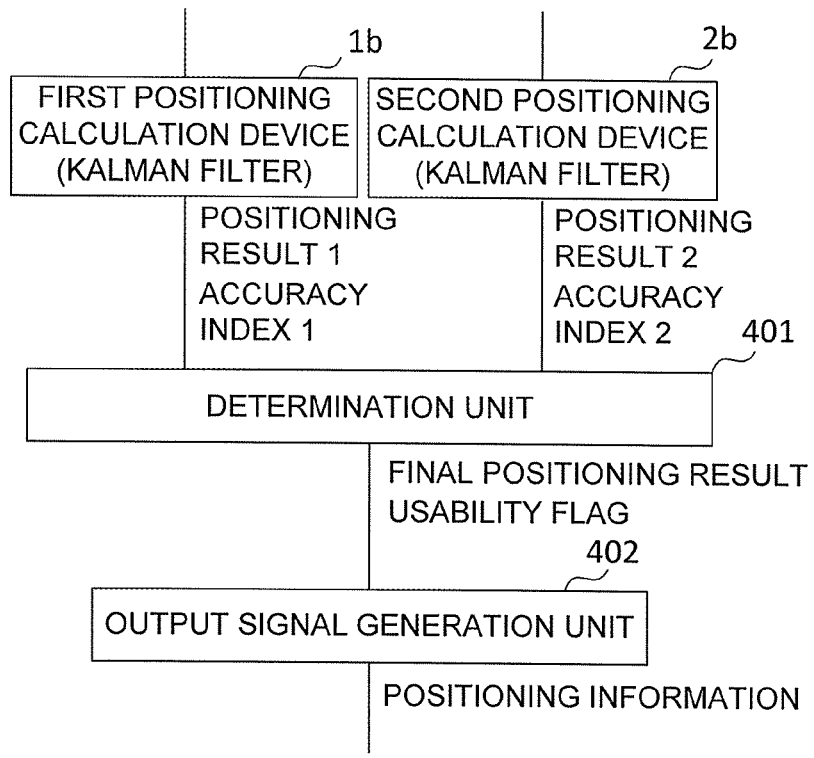
FIG. 3 is a diagram for illustrating functional blocks of positioning calculation devices and a determination device of FIG. 1.

FIG. 3 is a diagram for illustrating functional blocks of the first and second positioning calculation devices 1b and 2b and the determination device 4 of FIG. 1. Processing of the functional blocks of the determination device 4 is performed in accordance with programs stored in advance in the ROM 4c. Processing performed by the positioning calculation devices 1b and 2b and the determination device 4 is now described.

The first positioning calculation device 1b acquires, based on the signals received from the plurality of GPS satellites by the first antenna 1a, a positioning result 1 indicating a position of the first antenna 1a and an accuracy index 1 of the positioning result 1 in accordance with respective distances between the plurality of GPS satellites and the first antenna 1a.

Similarly, the second positioning calculation device 2b acquires, based on the signal received by the second antenna 2a, a positioning result 2 indicating a position of the second antenna 2a and an accuracy index 2 of the positioning result 2 in accordance with distances between the plurality of GPS satellites and the second antenna 2a.

A positioning method in this case that uses the GPS satellites may be any method capable of acquiring a positioning result and an accuracy index of the positioning result. The first and second positioning calculation devices 1b and 2b may be integrated into one positioning calculation device.

In accordance with the positioning results and their accuracy indices acquired by the first and second positioning calculation devices 1b and 2b, a determination unit 401 follows steps described below to acquire a final positioning result and a usability flag, which is a reliability index of the final positioning result.

Figure 4:
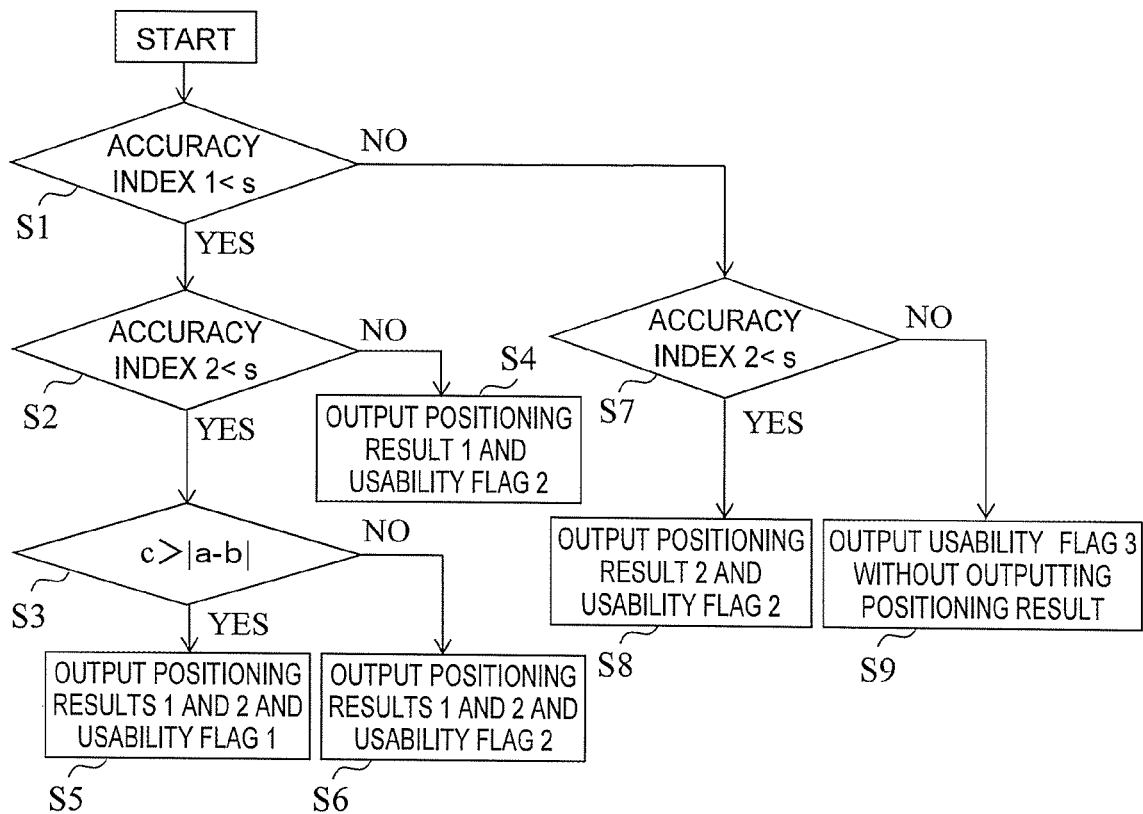
FIG. 4 is a flowchart for illustrating operation performed by a determination unit of FIG. 3.

FIG. 4 is a flowchart for illustrating operation performed by the determination unit 401. Symbols used in this operation are defined as follows.

s: Preset determination threshold for the accuracy index. In this case, the accuracy index having a smaller value indicates a higher accuracy.

b: b=|(positioning result 1)−(positioning result 2)|, that is, a measured distance between the first antenna 1a and the second antenna 2a that is acquired based on the positioning result 1 and the positioning result 2.

c: Determination threshold for a difference between an actual distance a between the first antenna 1a and the second antenna 2a and the measured distance b.

Appropriate values are set as s and b in accordance with the application to which the positioning is applied, such as a car navigation system or a train navigation system. In the case of the car navigation system, assuming that a lane width is 3 m, s is set to, for example, 50 cm or less as described later. Further, c is set to a value that is twice as large as the set value of s, for example.

When the determination unit 401 determines that the accuracy index 1 of the first antenna 1a is smaller than the threshold s, that is, the accuracy is higher than the threshold (Step S1), the accuracy index 2 of the second antenna 2a is smaller than the threshold s, that is, the accuracy is higher than the threshold (Step S2), and when the difference between the measured distance b and its actual distance is smaller than the threshold c, where the measured distance b is a difference between the first antenna 1a and the second antenna 2a obtained on the basis of the positioning result 1 and the positioning result 2, that is, the accuracy is higher than the threshold (Step S3), the determination unit 401 outputs the positioning results 1 and 2 as the final positioning result and outputs as the reliability index a usability flag 1 indicating that a desired positioning accuracy is now secured (Step S5).

When the difference between the measured distance b and the actual distance a is equal to or larger than the threshold c in Step S3, that is, the accuracy is equal to or lower than the threshold, the determination unit 401 outputs the positioning results 1 and 2 as the final positioning result and outputs as the reliability index a usability flag 2 indicating that the final positioning result is only a reference value, which shows that sufficient positioning accuracy is not guaranteed (Step S6).

When the accuracy index 1 of the first antenna 1a is smaller than the threshold s but the accuracy index 2 of the second antenna 2a is equal to or larger than the threshold s in Step S2, the determination unit 401 outputs the positioning result 1 as the final positioning result and outputs as the reliability index the usability flag 2 indicating that the final positioning result is only a reference value that cannot guarantee that the positioning accuracy is now sufficiently secured (Step S4).

When the accuracy index 1 of the first antenna 1a is equal to or larger than the threshold s in Step S1 and the accuracy index 2 of the second antenna 2a is smaller than the threshold s in Step S7, the determination unit 401 outputs the positioning result 2 as the final positioning result and outputs as the reliability index the usability flag 2 indicating that the final positioning result is only a reference value that cannot guarantee that the positioning accuracy is now sufficiently secured (Step S8). When the accuracy index 2 of the second antenna 2a is also equal to or larger than the threshold s in Step S7, the determination unit 401 does not output the positioning result and outputs as the reliability index a usability flag 3 indicating that the positioning accuracy failed to be acquired (Step S9). Therefore, in this example, the positioning result is not used in the case of the usability flag 3.

The above-mentioned processing is repeated at cycles set in advance.

An output signal generation unit 402 generates positioning information, which is an output signal for drive control of the HI 5, in accordance with the final positioning result and the usability flag from the determination unit 401, and outputs the positioning information to the HI 5.

The HI 5 makes an announcement through display or sound in accordance with the positioning information from the output signal generation unit 402. Here, the HI 5 performs processing that takes the positions of the respective antennas into consideration.

Figure 5:
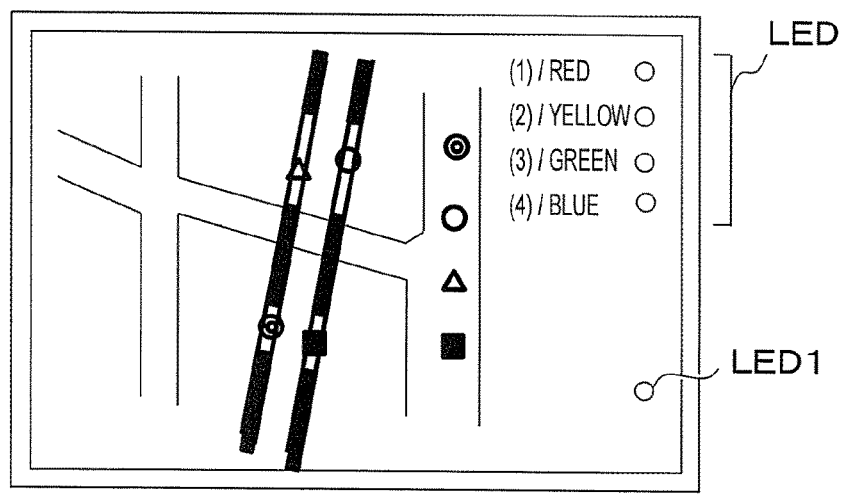
FIG. 5 is a diagram for illustrating an example of display on a human interface of FIG. 1.

FIG. 5 is an illustration of an example of display on the HI 5.

For example, positions corresponding to the final positioning results of the positioning information are indicated by symbols having different shapes (e.g., a double circle, a single circle, Δ, □, . . . ) in accordance with the rank of the usability flag.

As another example, in order to indicate the rank of the usability flag, the lights (LEDs) whose total number depends on the rank of the usability flag are turned on (for example, a larger number of lights are turned on as increasing rank of the accuracy). As still another example, LEDs of different colors (blue, green, yellow, red, . . . ) are turned on in accordance with the rank. As further another example, one LED is turned on in different colors to indicate the rank.

In regard to the application to which the positioning apparatus according to the present invention is applied, for example, when navigation is to be performed on a lane-by-lane basis in a car navigation system in which navigation is currently performed on a road-by-road basis, a lane on which a vehicle is traveling needs to be discriminated from another lane. Assuming that the lane width is 3 m, the position needs to be specified with an accuracy of 1.5 m which is half the lane width or less. Thus, a specific lane can be discriminated from another lane by setting a determination accuracy, which is determined through use of the determination threshold, to 1.5 m.

When the system is put into practical use, for example, the relationship of "3 s=1.5 m" (represented as "3σ=1.5 m" in general) is set in consideration of a safety factor, and the determination threshold s is set to 50 cm or smaller. In a train navigation system as well, the determination threshold s can similarly be set based on adjacent tracks (e.g., in the case of a double track, the distance between an inbound track and an outbound track).

Through use of the determination accuracy, for example, the car navigation system can be operated in the following manner. In both cases the notification is performed separately from the flags 1 to 3 or in addition to the flags 1 to 3, when an accuracy that allows a specific lane to be discriminated from another lane is acquired (usability flag C), it is determined that the navigation can be performed on a lane-by-lane basis, and an LED 1 of FIG. 5 is turned on in blue. When a required accuracy is not acquired, the LED 1 is turned on in red to show that the navigation is to be performed on a road-by-road basis as heretofore, thereby a user of the determination.

In the former case, the usability flag C is output in Steps S5, S6, S4, and S8 of FIG. 4, in which the condition of "(accuracy index)<s" is satisfied.

Examples of the positioning method that uses GPS satellites to acquire positioning results and accuracy indices, which is performed in the first and the second positioning calculation devices 1b and 2b, include Single Point Positioning, differential GPS (DGPS: Relative Positioning), and real time kinematic positioning (RTK GPS: interference positioning).

Single point positioning involves performing positioning calculation through use of pseudoranges which are calculated by the GPS receiver by using L1C/A codes from GPS satellites, where the GPS receiver corresponds to the positioning calculation device equipped with the antennas mentioned above. The pseudoranges calculated by the GPS receiver is acquired by an expression "radio wave propagation time from GPS satellite, which is acquired through observation of C/A code"בspeed of light".

The position of the GPS satellite is acquired by the GPS receiver based on orbital information received from the GPS satellite. The position of the antenna is then acquired based on the pseudoranges between the antenna and a plurality of GPS satellites whose positions are acquired. In this positioning, a Kalman filter is used for positioning calculation, and an error covariance when the position is acquired through the positioning using the Kalman filter is used as the above-mentioned accuracy index.

However, an actual speed of light decreases due to the ionosphere and the troposphere and is thus different from the speed of light in vacuum, and hence the pseudorange is calculated as a value larger than a true distance between the GPS satellite and the GPS receiver, that is, the antenna. Thus, a reference station, which is a station whose coordinate values (position on the earth) are known, is used. In the reference station, a pseudorange is calculated and the difference between a true distance (calculated based on coordinates of the GPS satellite, which are calculated based on the orbit information, and known coordinates of the reference station) and the pseudorange is calculated. Through use of this difference as information for correction, an error caused by the ionospheric delay and the tropospheric delay can be removed. This is a method generally referred to as "DGPS".

In contrast, RTK involves performing highly-accurate positioning with centimeter-level accuracy through use of not only the C/A code but also phase information of a carrier wave of the radio wave from the GPS satellites. In RTK, the distance between the GPS satellite and the GPS receiver, that is, the antenna is represented by $N \times \lambda + \theta$, and through calculation of N, which is referred to as "wavenumber" or "integer bias", highly-accurate positioning can be implemented. In this case, $\lambda$ represents a wavelength of the carrier wave, and $\theta$ represents a phase of the carrier wave to be observed by the GPS receiver.

In RTK, a state in which N is fixed as an integer number is referred to as "FIX state", and a positioning result in this state is referred to as "FIX solution". In contrast, a state in which N is not determined as an integer is referred to as "FLOAT state", and a positioning result in this state is referred to as "FLOAT solution".

The FIX solution has an accuracy of centimeters, whereas the FLOAT solution has an accuracy of from several tens of centimeters to several meters.

Utilization of FLOAT Solution

In general, when RTK is used, only a FIX solution tends to be adopted, while FLOAT solutions are rarely used. However, there is no solution in this case when the FIX solution cannot be acquired, and thus a positioning rate (positioning result utilization rate) decreases.

Some applications may be used without problems with the positioning accuracy of several tens of centimeters, and hence through comparison with the threshold of the accuracy index and comparison between the measured value and the true value of the distance between the antennas described above according to the present invention to determine the accuracy by using the FLOAT solution as well as the FIX solution, the positioning rate (positioning result utilization rate) can be increased.

In other words, irrespective of whether the solution is the FIX solution or the FLOAT solution, an error covariance acquired at the time of positioning calculation with the Kalman filter is used as the accuracy index, and the accuracy index is compared with the threshold to determine the accuracy, to thereby determine whether or not to use the positioning result. In this manner, the positioning rate (positioning result utilization rate) can be increased.

As in single point positioning, the error covariance is also acquired in DGPS and RTK positioning at the time of positioning calculation with the Kalman filter. This error covariance is then used as the above-mentioned accuracy index.

With the configuration of the positioning apparatus described above, that is, (1) Setting the threshold for the accuracy index (e.g., the error covariance acquired by the Kalman filter) acquired at the time of positioning calculation for the two antennas to determine the accuracy (first determination), and (2) positioning is performed for each of the two antennas, the distance between the two antennas is acquired based on the positioning results, and the threshold is set for the difference between the measured distance and the true distance to determine the accuracy (second determination), the accuracy of the positioning result is output together with the positioning result, and further, for example, a less accurate positioning result is prevented from being output. In this manner, it is possible to use the positioning result for which it is determined that the accuracy required in the application is now secured.

With this configuration, the following effects are achieved.

The utilization rate of the positioning result is increased to a rate higher than in the case of using only a highly-accurate positioning result, for example, a FIX solution. Even when a positioning error, for example, an erroneous FIX solution is occurs, such an error can be removed. Further, through combined use of the determination (1) and the determination (2), even when the difference is determined to be accidentally smaller than the threshold in the determination (2) under a state in which the positioning accuracy is low, which may occur with the related art, such an erroneous determination can be avoided through the determination (1).

The final accuracy index and the usability flag (reliability index) may be output from the determination unit 401 in a manner suited to the application to which the positioning apparatus is applied, and the manner of outputting the final accuracy index and the usability flag is not limited to the above-mentioned example. For example, a less accurate final positioning result may be output as necessary in Step S9 of FIG. 4. Further, the output signal generation unit 402 may generate the positioning information suited to the application to output the positioning information to the HI 5.

Second Embodiment

In the positioning apparatus and the positioning method according to the present invention, the number of antennas are not limited to two, and the apparatus and method are applicable to a case where a plurality of antennas are arranged. Thus, an example of a case where three antennas are arranged is described below.

Figure 6:
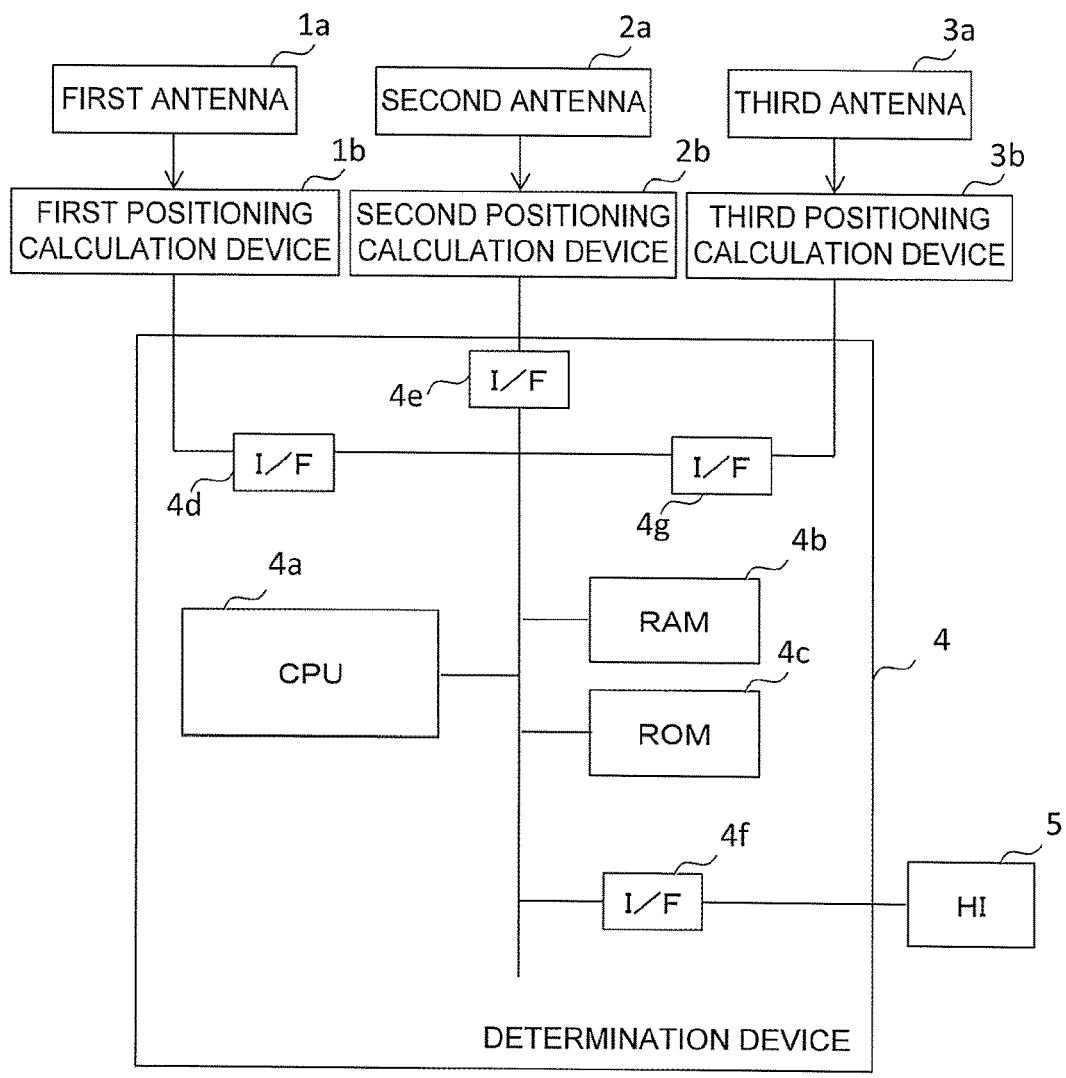
FIG. 6 is a diagram for illustrating a configuration of a positioning apparatus according to a second embodiment of the present invention.
Figure 7:
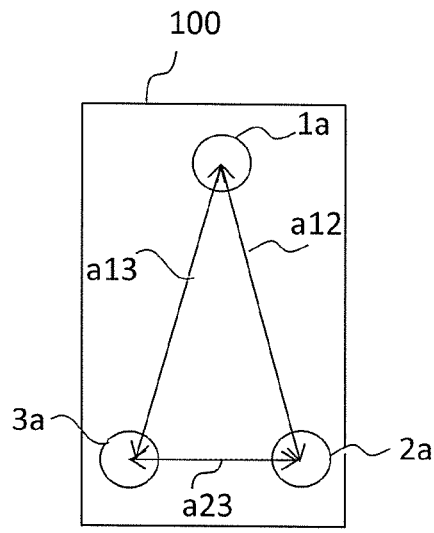
FIG. 7 is a diagram for illustrating an example of how antennas of FIG. 6 are arranged.

FIG. 6 is a diagram for illustrating a configuration of a positioning apparatus according to a second embodiment of the present invention. FIG. 7 is a diagram for illustrating an example of how antennas of FIG. 6 are arranged. FIG. 6 is an illustration of a configuration in a case where three antennas configured to receive signals from GPS satellites are arranged. As illustrated in FIG. 7, the first antenna 1a, the second antenna 2a, and a third antenna 3a are fixed onto the rigid body 100 of the vehicle body while being separated from each other by a distance set in advance.

A distance between the first antenna 1a and the second antenna 2a, a distance between the second antenna 2a and the third antenna 3a, and a distance between the first antenna 1a and the third antenna 3a are represented by a12, a23, and a13, respectively. In FIG. 7, the three antennas are arranged so as to be located at respective vertices of an isosceles triangle. However, there is no limitation on the distance between antennas, and the three distances may be the same, or may be different from one another.

RF signals from the first, second, and third antennas 1a, 2a, and 3a are used by the first positioning calculation device 1b, the second positioning calculation device 2b, and a third positioning calculation device 3b for positioning calculation, respectively, and further, the positioning results obtained by the respective positioning calculation devices are input to the determination device 4. The positioning results from the first, second, and third positioning calculation devices 1b, 2b, and 3b are input to the determination device 4 via the I/F 4d, the I/F 4e, and an I/F 4g, respectively.

Figure 8:
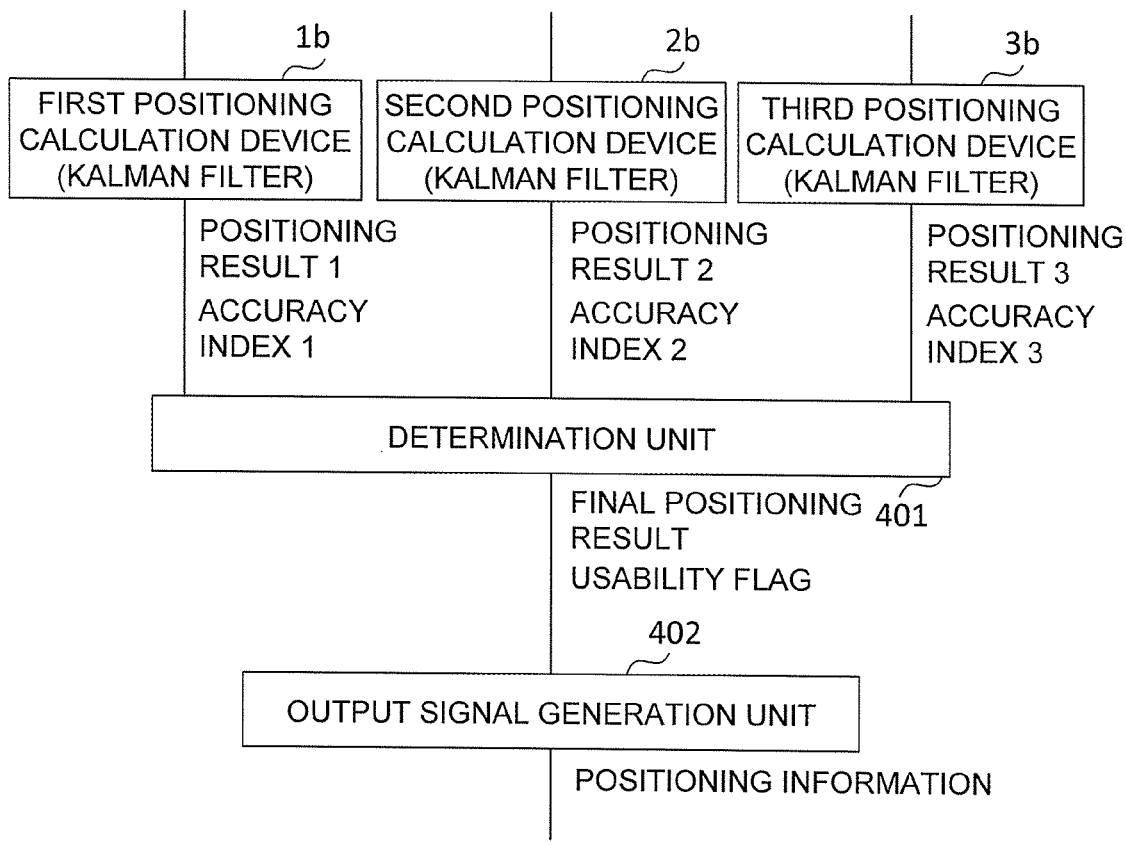
FIG. 8 is a diagram for illustrating functional blocks of positioning calculation devices and the determination device of FIG. 6.

FIG. 8 is a diagram for illustrating functional blocks of the positioning calculation devices and the determination device of FIG. 6. In the same manner as in the other positioning calculation devices, the third positioning calculation device 3b acquires, based on the signal received by the third antenna 3a, a positioning result 3 indicating a position of the third antenna 3a and an accuracy index 3 of the positioning result 3 in accordance with respective distances between a plurality of GPS satellites and the third antenna 3a.

Figure 9:
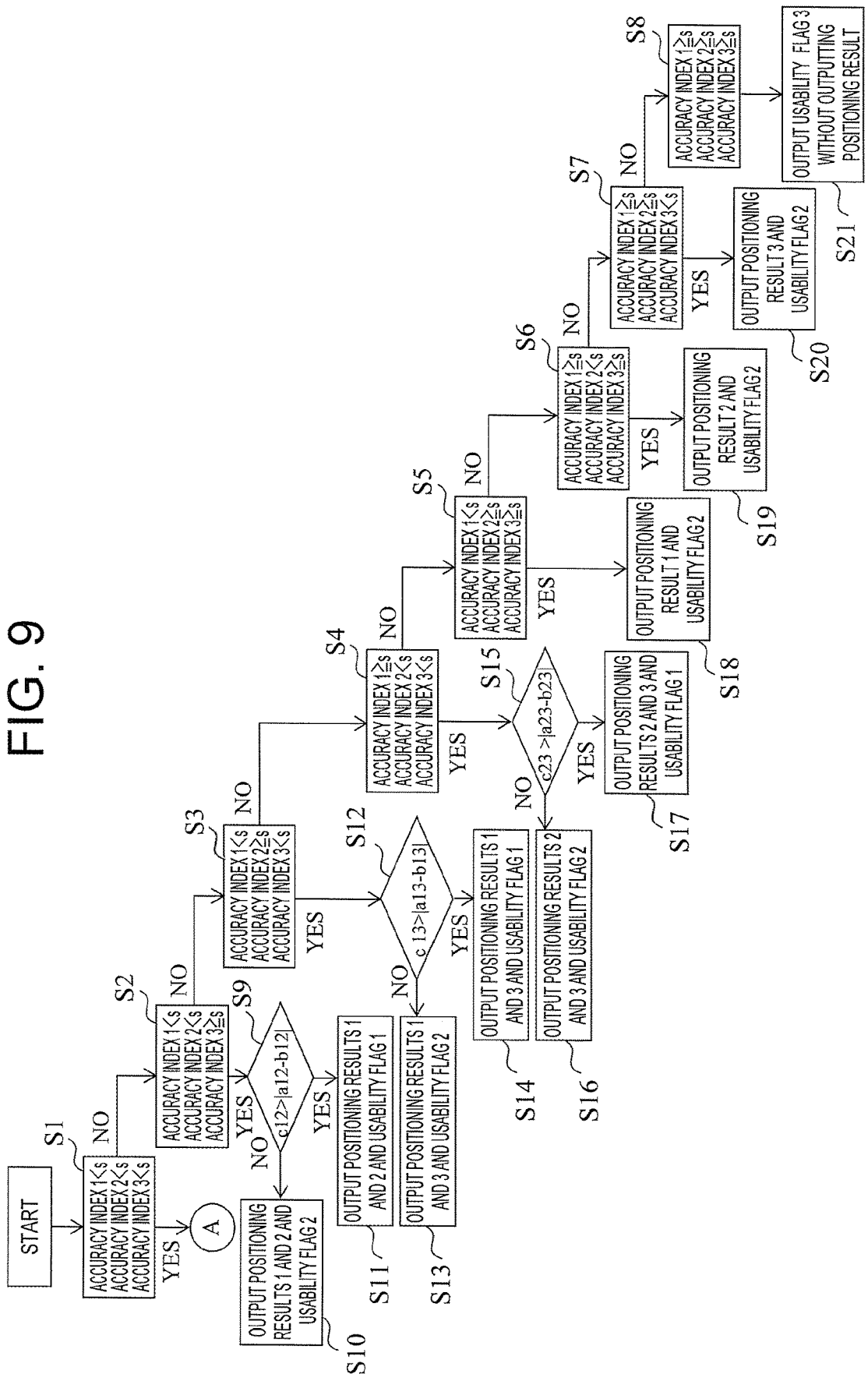
FIG. 9 is a flowchart for illustrating operation performed by the determination unit of FIG. 8.
Figure 10:
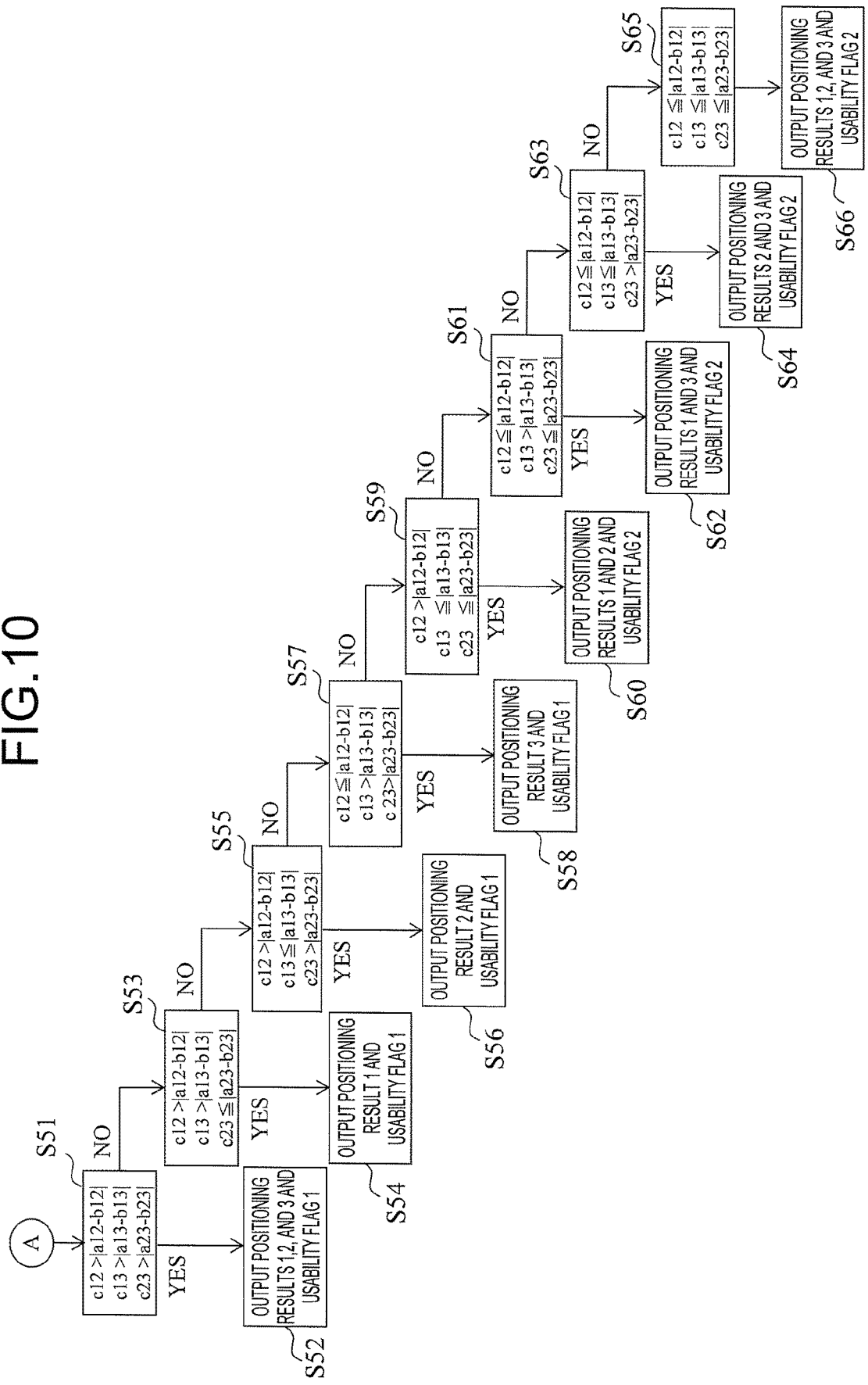
FIG. 10 is a flowchart for illustrating the operation performed by the determination unit of FIG. 8.

FIG. 9 and FIG. 10 are flowcharts for illustrating operation performed by the determination unit 401 of FIG. 8. Symbols used in this operation are defined as follows.

s: Preset determination threshold for the accuracy index. In this case, the accuracy index having a smaller value indicates a higher accuracy.

bxy: $b=|(positioning\ result\ x)-(positioning\ result\ y)|$, that is, a measured distance between an x-th antenna xa and a y-th antenna ya that is acquired based on a positioning result x and a positioning result y.

cxy: Determination threshold for a difference between an actual distance axy between the x-th antenna xa and the y-th antenna ya and the measured distance bxy.

As in the embodiment described above, appropriate values are set as s and bxy in accordance with the application to which the positioning is applied, such as a car navigation system or a train navigation system.

When the determination unit 401 determines that all of accuracy indices 1, 2, and 3 of the first, second, and third antennas 1a, 2a, and 3a are smaller than the threshold s, that is, their accuracies are higher than the threshold (Step S1 of FIG. 9), the processing proceeds to FIG. 10. In FIG. 10, when in three antenna pairs of the first and second antennas 1a and 2a, the second and third antennas 2a and 3a, and the first and third antennas 1a and 3a, the differences between the measured distances (b12, b23, and b13) and the actual distances (a12, a23, and a13) are smaller than the corresponding thresholds (c12, c23, and c13) for the respective antenna pairs, that is, their accuracies are higher than the threshold (Step S51), the determination unit 401 outputs positioning results 1, 2, and 3 as the final positioning result and outputs as the reliability index the usability flag 1 indicating that a desired positioning accuracy is now secured (Step S52).

When the difference between the measured distance and the actual distance is equal to or larger than the threshold in one of the three antenna pairs (Steps S53, S55, and S57), the determination unit 401 outputs as the final positioning result the positioning result of an antenna for which the differences between the measured distances between the antenna and other antennas forming a pair therewith and the actual distances therebetween are all smaller than the threshold, and outputs as the reliability index the usability flag 1 indicating that a desired positioning accuracy is now secured (Steps S54, S56, and S58).

When the difference between the measured distance and the actual distance is equal to or larger than the threshold in two of the three antenna pairs (Steps S59, S61, and S63), the determination unit 401 outputs as the final positioning result the respective positioning results of a pair of antennas for which the difference between the measured distance between the pair of antennas and the actual distance therebetween is smaller than the threshold, and outputs as the reliability index the usability flag 2 indicating that the final positioning result is only a reference value that cannot guarantee that the positioning accuracy is now sufficiently secured (Steps S60, S62, and S64).

When the difference between the measured distance and the actual distance is equal to or larger than the threshold in all of the three antenna pairs (Step S65), the determination unit 401 outputs as the final positioning result the positioning results of all of the antennas, and outputs as the reliability index the usability flag 2 indicating that the final positioning result is only a reference value that cannot guarantee that the positioning accuracy is now sufficiently secured (Step S66).

Referring back to FIG. 9, when the accuracy indices are smaller than the threshold s in two of the three antenna pairs (Steps S2, S3, and S4) and when the difference between the measured distance between a pair of antennas whose accuracy indices are smaller than the threshold s and the actual distance therebetween is smaller than the threshold (Steps S9, S12, and S15), the determination unit 401 outputs as the final positioning result the respective positioning results of the pair of antennas for which the difference between the measured distance between the pair of antennas and the actual distance therebetween is smaller than the threshold, and outputs as the reliability index the usability flag 1 indicating that a desired positioning accuracy is now secured (Steps S11, S14, and S17).

When the difference between the measured distance and the actual distance is equal to or larger than the threshold in Step S9, S12, or S15, the determination unit 401 outputs as the final positioning result the respective positioning results of a pair of antennas for which the difference between the measured distance between the pair of antennas and the actual distance therebetween is equal to or larger than the threshold, and outputs as the reliability index the usability flag 2 indicating that the final positioning result is only a reference value that cannot guarantee that the positioning accuracy is now sufficiently secured (Steps S10, S13, and S16).

When the accuracy index is smaller than the threshold s in only one of the three antenna pairs (Steps S5, S6, and S7), the determination unit 401 outputs as the final positioning result the positioning result of the antenna whose accuracy index is smaller than the threshold s, and outputs as the reliability index the usability flag 2 indicating that the final positioning result is only a reference value that cannot guarantee that the positioning accuracy is now sufficiently secured (Steps S18, S19, and S20).

When the accuracy indices 1, 2, and 3 of all of the antennas 1a, 2a, and 3a are equal to or larger than the threshold s (Step S8), the determination unit 401 does not output the positioning result and outputs the usability flag 3 indicating that the positioning accuracy failed to be acquired (Step S21). Therefore, in this example, the positioning result is not used in the case of the usability flag 3.

The above-mentioned processing is repeated at cycles set in advance.

The output signal generation unit 402 generates positioning information, which is an output signal for drive control of the HI 5, in accordance with the final positioning result and the usability flag from the determination unit 401, and outputs the positioning information to the HI 5.

Similar effects can be obtained even when the positioning apparatus is configured as described above.

The final accuracy index and the usability flag (reliability index) may be output from the determination unit 401 in a manner suited to the application to which the positioning apparatus is applied, and the manner of outputting the final accuracy index and the usability flag is not limited to the above-mentioned example. For example, a less accurate final positioning result may be output as necessary in Step S21 of FIG. 9. Further, the output signal generation unit 402 may generate the positioning information suited to the application to output the positioning information to the HI 5.

Further, even when the number of antennas is increased to four or more, similar effects can be obtained through the following processing. Specifically, in the same manner as described above, the accuracy is determined by the accuracy index for each of the antennas through the first determination, and the accuracy (magnitude) of the difference between the measured distance and the actual distance is determined for each of the antenna pairs through the second determination. Then, based on the determination results, in principle, the positioning result satisfying a determination criterion for the accuracy index is used as the final positioning result (when there are a plurality of such positioning results, an average value of the positioning results may be used), and the reliability index formed of the usability flag and others is further generated in accordance with the results of the first determination and the second determination. Desired output is then performed in accordance with the final positioning result and the reliability index.

It is desired that the number of antennas to be used be selected in accordance with the size and usage of a mobile body.

INDUSTRIAL APPLICABILITY

The positioning apparatus and the positioning method according to the present invention are applicable to positioning in various fields.

REFERENCE SIGNS LIST 1a, 2a, 3a antenna, 1b, 2b, 3b positioning calculation device, 4 determination device, 4a CPU, 4b RAM, 4c ROM, 4d to 4g interface (I/F), 5 human interface (HI), 100 rigid body, 401 determination unit, 402 output signal generation unit

The invention claimed is:

1. A positioning apparatus, comprising:
   a plurality of antennas, including first and second antennas, configured to receive signals from GPS satellites;
   positioning calculation devices configured to perform positioning for respective antennas, respectively, to obtain positioning results indicating positions of the plurality of antennas and accuracy indices indicating accuracies of the positioning results;
   a processor connected to the positioning calculation devices and configured to execute a program, and
   a memory in the processor to store the program which, when executed by the processor, performs processes of:
   performing a first determination of determining whether or not an accuracy index of the first antenna indicates an accuracy higher than an accuracy indicated by a first threshold and generating a first output when the first accuracy index indicates a higher accuracy and, when not, a second output,
   performing, when the first output is generated, a second determination of determining whether or not an accuracy index of the second antenna indicates an accuracy higher than an accuracy indicated by the first threshold, and generating a third output when the second accuracy index indicates a higher accuracy and, when not, a fourth output,
   performing, when the third output is generated, a third determination of determining whether or not a difference between a measured distance between the first and second antennas based on a difference between positioning results of the first and second antennas and a known distance between the first and second antennas is smaller than a second threshold and generating a fifth output when the difference between the measured distance between the first and second antennas based on the difference between positioning results of the first and second antennas and the known distance between the first and second antennas is smaller than the second threshold, and if not smaller, generating a sixth output,
   performing, when the second output is generated, a fourth determination of determining whether or not an accuracy index of the second antenna indicates a higher accuracy than an accuracy indicated by the first threshold, and generating a seventh output when the second accuracy index indicates a higher accuracy and, when not, an eighth output,
   outputting, when the fifth output is generated, positioning results of the first and second antennas and a first usability flag serving as a first reliability index indicating that a desired positioning accuracy is secured,
   outputting, when the sixth output is generated, positioning results of the first and second antennas and a second usability flag serving as a second reliability index indicating that a desired positioning accuracy is not guaranteed,
   outputting, when the seventh output is generated, positioning results of the second antenna and the second usability flag,
   outputting, when the eighth output is generated, a third usability flag serving as a third reliability index indicating that the positioning accuracy has failed to be acquired, and
   generating positioning information for controlling a human interface for notification of outputted positioning result and the outputted usability flag.

2. The positioning apparatus according to claim 1, wherein the memory stores a program for performing processes of:
   outputting, when the fourth output is generated, positioning results of the first antenna and the second usability flag.

3. The positioning apparatus according to claim 2,
   wherein each of the positioning calculation devices is configured to perform positioning comprising any one of single point positioning, DGPS, and RTK positioning as positioning that uses the GPS satellites, and
   wherein the accuracy index comprises an error covariance acquired by a Kalman filter in the positioning.

4. The positioning apparatus according to claim 1,
   wherein each of the positioning calculation devices is configured to perform positioning comprising any one of single point positioning, DGPS, and RTK positioning as positioning that uses the GPS satellites, and
   wherein the accuracy index comprises an error covariance acquired by a Kalman filter in the positioning.

5. The positioning apparatus according to claim 1, further comprising the human interface configured to display or to make an announcement by sound in accordance with the positioning information.

* * * * *